US007364085B2

(12) United States Patent
Jones (10) Patent No.: US 7,364,085 B2
(45) Date of Patent: Apr. 29, 2008

(54) IDENTIFICATION DOCUMENT WITH PRINTING THAT CREATES MOVING AND THREE DIMENSIONAL IMAGE EFFECTS WITH PULSED ILLUMINATION

(75) Inventor: Robert Jones, Andover, MA (US)

(73) Assignee: Digimarc Corporation, Beaverton, OR (US)

( * ) Notice: Subject to any disclaimer, the term of this patent is extended or adjusted under 35 U.S.C. 154(b) by 770 days.

(21) Appl. No.: 10/676,375

(22) Filed: Sep. 30, 2003

(65) Prior Publication Data

US 2006/0169785 A1    Aug. 3, 2006

(51) Int. Cl.
*G06K 19/06* (2006.01)
*G06K 7/10* (2006.01)
*G06K 7/14* (2006.01)
*G08C 21/00* (2006.01)

(52) U.S. Cl. .................. 235/491; 235/454; 235/462.06; 235/468

(58) Field of Classification Search ............... 235/491, 235/454, 462.06, 468; 283/94, 72, 91
See application file for complete search history.

(56) References Cited

U.S. PATENT DOCUMENTS

| | | | |
|---|---|---|---|
| 4,522,881 A | 6/1985 | Kobayashi et al. | |
| 4,599,259 A | 7/1986 | Kobayashi et al. | |
| 4,627,997 A | 12/1986 | Ide | |
| 4,703,572 A * | 11/1987 | Chapin ........................ | 40/442 |
| 4,866,025 A | 9/1989 | Byers et al. | |
| 4,866,027 A | 9/1989 | Henzel | |
| 4,871,714 A | 10/1989 | Byers et al. | |
| 4,876,234 A | 10/1989 | Henzel | |
| 4,876,237 A | 10/1989 | Byers et al. | |
| 4,891,351 A | 1/1990 | Byers et al. | |
| 5,006,503 A | 4/1991 | Byers et al. | |
| 5,011,816 A | 4/1991 | Byers et al. | |
| 5,079,411 A | 1/1992 | Lee | |
| 5,089,350 A | 2/1992 | Talvalkar et al. | |
| 5,157,424 A | 10/1992 | Craven et al. | |
| 5,168,646 A * | 12/1992 | Dippong et al. .............. | 40/442 |
| 5,270,526 A | 12/1993 | Yoshihara | |
| 5,380,044 A | 1/1995 | Aitkens et al. | |
| 5,380,695 A | 1/1995 | Chiang et al. | |
| 5,421,869 A | 6/1995 | Gundjian et al. | |
| 5,502,304 A * | 3/1996 | Berson et al. .............. | 250/271 |

(Continued)

FOREIGN PATENT DOCUMENTS

EP          0464268          1/1992

(Continued)

OTHER PUBLICATIONS

PCT—Notification of Transmittal of the International Search Report or the Declaration, for International Application No. PCT/US02/41680, mailed on Jun. 5, 2003.

(Continued)

*Primary Examiner*—Daniel Walsh (57) ABSTRACT

Identification documents have a three dimensional or moving image effect to enable human verification of their authenticity. These effects are created by printing image layers of invisible inks, such as UV or IR fluorescing inks, each depicting an object in varying position or perspective in an area on the document. When the area is strobed sequentially in different bands corresponding to the different layers, the layers become visible sequentially or simultaneously, creating a moving and/or three dimensional effect.

35 Claims, 3 Drawing Sheets

U.S. PATENT DOCUMENTS

| | | | |
|---|---|---|---|
| 5,514,860 A | 5/1996 | Berson | |
| 5,516,362 A | 5/1996 | Gundjian et al. | |
| 5,522,623 A | 6/1996 | Soules et al. | |
| 5,525,403 A | 6/1996 | Kawabata et al. | |
| 5,525,798 A * | 6/1996 | Berson et al. | 250/271 |
| 5,654,105 A | 8/1997 | Obringer et al. | |
| 5,683,774 A | 11/1997 | Faykish et al. | |
| 5,714,291 A | 2/1998 | Marinello et al. | |
| 5,757,016 A * | 5/1998 | Dunn et al. | 250/492.1 |
| 5,935,694 A | 8/1999 | Olmstead et al. | |
| 5,944,881 A * | 8/1999 | Mehta et al. | 106/31.28 |
| 5,965,242 A | 10/1999 | Patton et al. | |
| 5,988,820 A | 11/1999 | Huang et al. | |
| 6,032,860 A * | 3/2000 | Brian | 235/454 |
| 6,064,414 A | 5/2000 | Kobayashi et al. | |
| 6,066,594 A | 5/2000 | Gunn et al. | |
| 6,071,855 A | 6/2000 | Patton et al. | |
| 6,110,864 A | 8/2000 | Lu | |
| 6,146,032 A | 11/2000 | Dunham | |
| 6,155,605 A | 12/2000 | Bratchley et al. | |
| 6,174,400 B1 | 1/2001 | Krutak et al. | |
| 6,184,534 B1 * | 2/2001 | Stephany et al. | 250/459.1 |
| 6,234,537 B1 * | 5/2001 | Gutmann et al. | 283/86 |
| 6,286,761 B1 * | 9/2001 | Wen | 235/468 |
| 6,368,684 B1 | 4/2002 | Onishi et al. | |
| 6,369,947 B1 * | 4/2002 | Staub et al. | 359/574 |
| 6,380,131 B2 | 4/2002 | Griebel et al. | |
| 6,400,386 B1 | 6/2002 | No | |
| 6,817,530 B2 * | 11/2004 | Labrec et al. | 235/487 |
| 7,243,952 B2 * | 7/2007 | Shimada et al. | 283/93 |
| 2002/0130182 A1 * | 9/2002 | Mondie | 235/468 |
| 2002/0135699 A1 * | 9/2002 | Jacobs | 348/597 |
| 2003/0009922 A1 * | 1/2003 | Liu | 40/434 |
| 2006/0169785 A1 * | 8/2006 | Jones | 235/491 |
| 2006/0187298 A1 * | 8/2006 | Jacobs | 348/42 |
| 2006/0256136 A1 * | 11/2006 | O'Donnell et al. | 345/629 |
| 2007/0200002 A1 * | 8/2007 | Raksha et al. | 235/491 |

FOREIGN PATENT DOCUMENTS

| | | |
|---|---|---|
| EP | 0356980 | 5/1992 |
| EP | 0356981 | 5/1992 |
| EP | 0366923 | 5/1992 |
| EP | 0374835 | 11/1992 |
| EP | 0356982 | 12/1992 |
| EP | 0362640 | 12/1992 |
| EP | 0373572 | 3/1993 |
| EP | 0446834 | 6/1994 |
| EP | 0446846 | 8/1994 |
| EP | 0539001 | 6/1995 |
| EP | 0982149 | 3/2000 |
| EP | 1013463 | 6/2000 |
| EP | 1017016 | 7/2000 |
| JP | 6234289 | 8/1994 |
| JP | 11301121 | 11/1999 |
| JP | 11321166 | 11/1999 |
| WO | WO97/32733 | 9/1997 |
| WO | WO 98/40223 | 9/1998 |
| WO | WO99/14055 | 3/1999 |
| WO | WO00/16984 | 3/2000 |
| WO | WO00/78556 | 12/2000 |
| WO | WO01/56806 | 8/2001 |
| WO | WO 02/45969 | 6/2002 |
| WO | WO 02/096666 | 12/2002 |

OTHER PUBLICATIONS

PCT—International Search Report for for International Application No. PCT/USO2/41680, mailed on Jun. 5, 2003.

Printed copy of DataCard Group web page entitled "Secure ID Center: Design a Secure ID card Key technologies for a secure ID", 5 printed pages, printed on Dec. 12, 2002 and accessed from: http://www.datacard.com/secureid/secureid.sub.—card.sub.—technologies.s- ub.—features.shtm.

Printed copy of a Polaroid Press Release, dated Jul. 30, 1998. entitled "Polaroids's Polaprime UV Invisible Ink System Winks at Hollywood As Godzilla's Eye in Promo Display," 2 printed pages, printed on Nov. 26, 2002 and accessed from: http://www.polaroid.com/polinfo/press.sub.—releases/august98/080598a.html.

Printed copy of first two pages of a web page entitled "Technologies Overview," 2 printed pages, printed on Dec. 22, 2002 and accessed from: http://www.nfive.com/Articlesâ2.htm.

Printed copy of first two pages of a Kuro5shin web page entitled "What are 'Dye Sublimation Thermal Printers'? (Technology)", dated Sep. 19, 2003, 2 printed pages, printed on Dec. 22, 2002 and accessed from: http://www.kuro5shin.org/story/2002/9/19/135037/691.

Printed copy of a Raco Industries web page entitled "About Card Printing How it Works," 3 printed pages, printed on Dec. 22, 2002 and accessed from: http://www.racoindustries.com/aboutcardp5.htm.

* cited by examiner

IDENTIFICATION DOCUMENT WITH PRINTING THAT CREATES MOVING AND THREE DIMENSIONAL IMAGE EFFECTS WITH PULSED ILLUMINATION

RELATED APPLICATION DATA

This application is related to the following U.S. patent applications:

Ser. No. 10/330,032 (published as US 2003-0173406 A1 on Sep. 18, 2003) describing how to apply UV and other security features in identification documents, which may be used in embodiments of the invention.

U.S. Pat. No. 6,817,530 describing how to manufacture identification documents in a central issue process, which may be used to make embodiments of the invention.

Ser. No. 60/495,373 describing how to incorporate and use a variety of security features, such as digital watermarks referenced in this document, into identification documents.

Each of the above U.S. Patent documents is herein incorporated by reference in its entirety.

TECHNICAL FIELD

The invention generally relates to identification and security documents, and in particular, relates to security features for documents that create special effects under particular forms of illumination.

BACKGROUND OF SUMMARY

Identification Documents

Identification documents (hereafter "ID documents") play a critical role in today's society. One example of an ID document is an identification card ("ID card"). ID documents are used on a daily basis—to prove identity, to verify age, to access a secure area, to evidence driving privileges, to cash a check, and so on. Airplane passengers are required to show an ID document during check in, security screening and prior to boarding their flight. In addition, because we live in an ever-evolving cashless society, ID documents are used to make payments, access an automated teller machine (ATM), debit an account, or make a payment, etc.

(For the purposes of this disclosure, ID documents are broadly defined herein, and include, e.g., credit cards, bank cards, phone cards, passports, driver's licenses, network access cards, employee badges, debit cards, security cards, visas, immigration documentation, national ID cards, citizenship cards, social security cards, security badges, certificates, identification cards or documents, voter registration cards, police ID cards, border crossing cards, legal instruments, security clearance badges and cards, gun permits, gift certificates or cards, membership cards or badges, etc., etc. Also, the terms "document," "card," "badge" and "documentation" are used interchangeably throughout this patent application.).

Many types of identification cards and documents, such as driving licenses, national or government identification cards, bank cards, credit cards, controlled access cards and smart cards, carry certain items of information which relate to the identity of the bearer. Examples of such information include name, address, birth date, signature and photographic image; the cards or documents may in addition carry other variable data (i.e., data specific to a particular card or document, for example an employee number) and invariant data (i.e., data common to a large number of cards, for example the name of an employer). All of the cards described above will be generically referred to as "ID documents".

Figure 1:
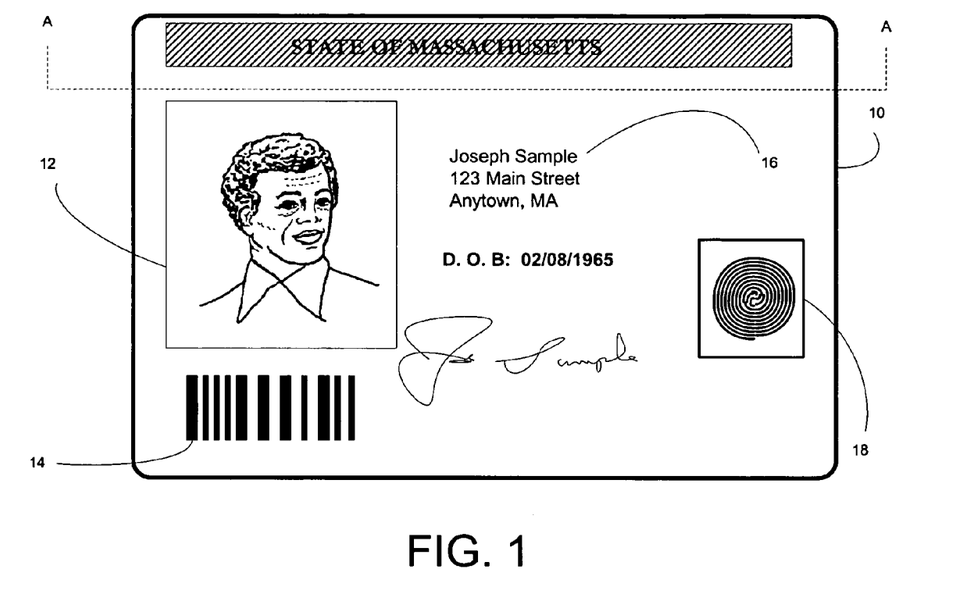
FIG. 1 is an illustrative example of an identification document.
Figure 2:
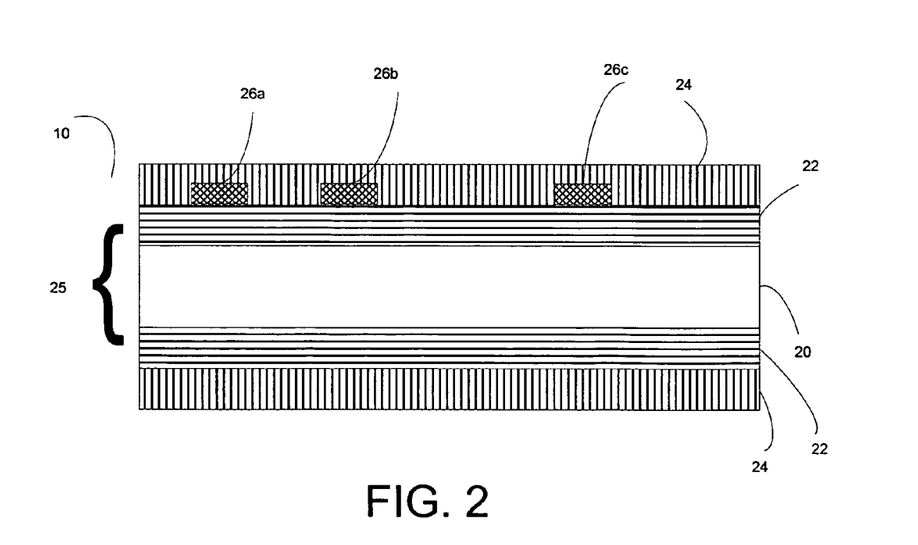
FIG. 2 is an illustrative cross section of the identification document of FIG. 1, taken along the A-A line.

FIGS. 1 and 2 illustrate a front view and cross-sectional view (taken along the A-A line), respectively, of an exemplary prior art identification (ID) document 10. In FIG. 1, the prior art ID document 1 includes a photographic image 12, a bar code 14 (which may contain information specific to the person whose image appears in photographic image 12 and/or information that is the same from ID document to ID document), variable personal information 16, such as an address, signature, and/or birthdate, and biometric information 18 associated with the person whose image appears in photographic image 12 (e.g., a fingerprint, a facial image or template, or iris or retinal template), a magnetic stripe (which, for example, can be on a side of the ID document that is opposite the side with the photographic image), and various security features, such as a security pattern (for example, a printed pattern comprising a tightly printed pattern of finely divided printed and unprinted areas in close proximity to each other, such as a fine-line printed security pattern as is used in the printing of banknote paper, stock certificates, and the like).

Referring to FIG. 2, the ID document 10 comprises a pre-printed core 20 (also referred to as a substrate). In many applications, the core can be a light-colored, opaque material (e.g., TESLIN (available from PPG Industries) or polyvinyl chloride (PVC) material). The core 20 is laminated with a transparent material, such as clear PVC material 22, which, by way of example, can be about 1-5 mil thick. The composite of the core 20 and clear PVC material 22 form a so-called "card blank" 25 that can be up to about 30 mils thick. Information 26a-c is printed on the card blank 25 using a method such as Laser Xerography or Dye Diffusion Thermal Transfer ("D2T2") printing (e.g., as described in commonly assigned U.S. Pat. No. 6,066,594, which is incorporated hereto by reference in its entirety.) The information 26a-c can, for example, comprise an indicium or indicia, such as the invariant or nonvarying information common to a large number of identification documents, for example the name and logo of the organization issuing the documents. The information 26a-c may be formed by any known process capable of forming the indicium on the specific core material used.

To protect the information that is printed, an additional layer of transparent overlaminate can be coupled to the card blank and printed information, as is known by those skilled in the art. Illustrative examples of usable materials for overlaminates include biaxially oriented polyester or other optically clear durable plastic film.

In the production of images useful in the field of identification documentation, it may be desirable to embody into a document (such as an ID card, drivers license, passport or the like) data or indicia representative of the document issuer (e.g., an official seal, or the name or mark of a company or educational institution) and data or indicia representative of the document bearer (e.g., a photographic likeness, name or address). Typically, a pattern, logo or other distinctive marking representative of the document issuer will serve as a means of verifying the authenticity, genuineness or valid issuance of the document. A photographic likeness or other data or indicia personal to the bearer will validate the right of access to certain facilities or the prior authorization to engage in commercial transactions and activities.

Identification documents, such as ID cards, having printed background security patterns, designs or logos and identification data personal to the card bearer have been known and are described, for example, in U.S. Pat. No. 3,758,970, issued Sep. 18, 1973 to M. Annenberg; in Great Britain Pat. No. 1,472,581, issued to G. A. O. Gesellschaft Fur Automation Und Organisation mbH, published Mar. 10, 1976; in International Patent Application PCT/GB82/00150, published Nov. 25, 1982 as Publication No. WO 82/04149; in U.S. Pat. No. 4,653,775, issued Mar. 31, 1987 to T. Raphael, et al.; in U.S. Pat. No. 4,738,949, issued Apr. 19, 1988 to G. S. Sethi, et al.; and in U.S. Pat. No. 5,261,987, issued Nov. 16, 1993 to J. W. Luening, et al. All of the aforementioned documents are hereby incorporated by reference.

Printing Information onto ID Documents

The advent of commercial apparatus (printers) for producing dye images by thermal transfer has made relatively commonplace the production of color prints from electronic data acquired by a video camera. In general, this is accomplished by the acquisition of digital image information (electronic signals) representative of the red, green and blue content of an original, using color filters or other known means. Devices such as digital cameras, optical sensors, and scanners also can provide digital image information. The digital image information is utilized to print an image onto a data carrier. For example, information can be printed using a printer having a plurality of small heating elements (e.g., pins) for imagewise heating of each of a series of donor sheets (respectively, carrying diffuseable cyan, magenta and yellow dye). The donor sheets are brought into contact with an image-receiving element (which can, for example, be a substrate), which has a layer for receiving the dyes transferred imagewise from the donor sheets. Thermal dye transfer methods are described, for example, in U.S. Pat. No. 4,621,271, issued Nov. 4, 1986 to S. Brownstein and U.S. Pat. No. 5,024,989, issued Jun. 18, 1991 to Y. H. Chiang, et al. Each of these patents is hereby incorporated by reference.

Dye diffusion thermal transfer printing ("D2T2") and thermal transfer (also referred to as mass transfer printing) are two printing techniques that have been used to print information on identification cards. For example, D2T2 has been used to print images and pictures, and thermal transfer has been used to print text, bar codes, and single color graphics.

D2T2 is a thermal imaging technology that allows for the production of photographic quality images. In D2T2 printing, one or more thermally transferable dyes (e.g., cyan, yellow, and magenta) are transferred from a donor, such as a donor dye sheet or a set of panels (or ribbons) that are coated with a dye (e.g., cyan, magenta, yellow, black, etc.) to a receiver sheet (which could, for example, be part of an ID document) by the localized application of heat or pressure, via a stylus or thermal printhead at a discrete point. When the dyes are transferred to the receiver, the dyes diffuse into the sheet (or ID card substrate), where the dyes will chemically be bound to the substrate or, if provided, to a receptor coating. Typically, printing with successive color panels across the document creates an image in or on the document's surface. D2T2 can result in a very high printing quality, especially because the energy applied to the thermal printhead can vary to vary the dye density in the image pixels formed on the receiver, to produce a continuous tone image. D2T2 can have an increased cost as compared to other methods, however, because of the special dyes needed and the cost of D2T2 ribbons. Also, the quality of D2T2-printed image may depend at least on an ability of a mechanical printer system to accurately spatially register a printing sequence, e.g., yellow, magenta, cyan, and black.

Another thermal imaging technology is thermal or mass transfer printing. With mass transfer printing, a material to be deposited on a receiver (such as carbon black (referred to by the symbol "K")) is provided on a mass transfer donor medium. When localized heat is applied to the mass transfer donor medium, a portion (mass) of the material is physically transferred to the receiver, where it sits "on top of" the receiver. For example, mass transfer printing often is used to print text, bar codes, and monochrome images. Resin black mass transfer has been used to print grayscale pictures using a dithered gray scale, although the image can sometimes look coarser than an image produced using D2T2. However, mass transfer printing can sometimes be faster than D2T2, and faster printing can be desirable in some situations.

Printing of black ("K") can be accomplished using either D2T2 or mass transfer. For example, black monochrome "K" mass transfer ribbons include Kr (which designates a thermal transfer ribbon) and Kd (which designates dye diffusion).

Both D2T2 and thermal ink have been combined in a single ribbon, which is the well-known YMCK (Yellow-Magenta-Cyan-Black) ribbon (the letter "K" is used to designate the color black in the printing industry). Another panel containing a protectant ("P") or laminate (typically a clear panel) also can be added to the YMCK ribbon).

In addition to these forms of printing, other forms of printing and applying variable data are used in ID documents, including ink jet printing, laser printing and laser engraving.

Manufacture and Printing Environments

Commercial systems for issuing ID documents are of two main types, namely so-called "central" issue (CI), and so-called "on-the-spot" or "over-the-counter" (OTC) issue.

CI type ID documents are not immediately provided to the bearer, but are later issued to the bearer from a central location. For example, in one type of CI environment, a bearer reports to a document station where data is collected, the data are forwarded to a central location where the card is produced, and the card is forwarded to the bearer, often by mail. Another illustrative example of a CI assembling process occurs in a setting where a driver passes a driving test, but then receives her license in the mail from a CI facility a short time later. Still another illustrative example of a CI assembling process occurs in a setting where a driver renews her license by mail or over the Internet, then receives a drivers license card through the mail.

In contrast, a CI assembling process is more of a bulk process facility, where many cards are produced in a centralized facility, one after another. (For example, picture a setting where a driver passes a driving test, but then receives her license in the mail from a CI facility a short time later. The CI facility may process thousands of cards in a continuous manner.).

Centrally issued identification documents can be produced from digitally stored information and generally comprise an opaque core material (also referred to as "substrate"), such as paper or plastic, sandwiched between two layers of clear plastic laminate, such as polyester, to protect the aforementioned items of information from wear, exposure to the elements and tampering. The materials used in such CI identification documents can offer the ultimate in durability. In addition, centrally issued digital identification documents generally offer a higher level of security than OTC identification documents because they offer the ability to pre-print the core of the central issue document with security features such as "micro-printing", ultra-violet security features, security indicia and other features currently unique to centrally issued identification documents.

In addition, a CI assembling process can be more of a bulk process facility, in which many cards are produced in a centralized facility, one after another. The CI facility may, for example, process thousands of cards in a continuous manner. Because the processing occurs in bulk, CI can have an increase in efficiency as compared to some OTC processes, especially those OTC processes that run intermittently. Thus, CI processes can sometimes have a lower cost per ID document, if a large volume of ID documents are manufactured.

In contrast to CI identification documents, OTC identification documents are issued immediately to a bearer who is present at a document-issuing station. An OTC assembling process provides an ID document "on-the-spot". (An illustrative example of an OTC assembling process is a Department of Motor Vehicles ("DMV") setting where a driver's license is issued to person, on the spot, after a successful exam.). In some instances, the very nature of the OTC assembling process results in small, sometimes compact, printing and card assemblers for printing the ID document. It will be appreciated that an OTC card issuing process is by its nature can be an intermittent—in comparison to a continuous—process.

OTC identification documents of the types mentioned above can take a number of forms, depending on cost and desired features. Some OTC ID documents comprise highly plasticized poly(vinyl chloride) or have a composite structure with polyester laminated to 0.5-2.0 mil (13-51 .mu.m) poly(vinyl chloride) film, which provides a suitable receiving layer for heat transferable dyes which form a photographic image, together with any variant or invariant data required for the identification of the bearer. These data are subsequently protected to varying degrees by clear, thin (0.125-0.250 mil, 3-6 .mu.m) overlay patches applied at the printhead, holographic hot stamp foils (0.125-0.250 mil 3-6 .mu.m), or a clear polyester laminate (0.5-10 mil, 13-254 .mu.m) supporting common security features. These last two types of protective foil or laminate sometimes are applied at a laminating station separate from the printhead. The choice of laminate dictates the degree of durability and security imparted to the system in protecting the image and other data.

UV/IR Security Features in ID Documents

One response to the problem of counterfeiting ID documents has involved the integration of verification features that are difficult to copy by hand or by machine, or which are manufactured using secure and/or difficult to obtain materials. One such verification feature is the use in the card of a signature of the card's issuer or bearer. Other verification features have involved, for example, the use of digital watermarks, biometric information, microprinting, covert materials or media (e.g., ultraviolet (UV) inks, infrared (IR) inks, fluorescent materials, phosphorescent materials), optically varying images, fine line details, validation patterns or marking, and polarizing stripes. These verification features are integrated into an identification card in various ways and they may be visible or invisible (covert) in the finished card. If invisible, they can be detected by viewing the feature under conditions that render it visible. At least some of the verification features discussed above have been employed to help prevent and/or discourage counterfeiting.

Covert security features are those features whose presence is not visible to the user without the use of special tools (e.g., UV or IR lights, digital watermark readers) or knowledge. In many instances, a covert security feature is normally invisible to a user. Some technologies that involve invisible features require the use of specialized equipment, such as a detector or a device capable of reading digital watermarks. One type of covert security feature is the printing of information (images, designs, logos, patterns, text, etc.) in a material that is not visible under normal lighting conditions, but can be viewed using a special non-visible light source, such as an ultraviolet (UV) or infrared (IR) light source. Use of UV and/or IR security features can be advantageous because although the devices (for example, UV and/or IR light sources) required to see and use such features are commonly available at a reasonable cost, the ability to manufacture and/or copy at least some implementations of such features is far less common and can be very costly. UV and IR based covert security features thus can help deter counterfeiters because the features cannot be copied by copiers or scanners and are extremely difficult to manufacture without the requisite know-how, equipment, and materials.

For example, the assignee of the present invention has developed and marketed a proprietary product called PolaPrime-UV™. PolaPrime-UV™ is a type of security feature. One application of PolaPrime-UV™ is for full color photo quality printing of fixed (i.e., not variable data) fluorescent images. The artwork that can be printed using PolaPrime-UV™ includes many images that can be produced with a combination of red, green, and blue phosphors. Under the appropriate light (e.g., a light source capable of providing UV light), the effect seen when viewing an image printed with PolaPrime-UV™ is similar in appearance to a television screen in that the image is formed by emission of light rather than reflection as with ink on paper. To date, PolaPrime-UV™ has been a reliable authenticator for genuine identification documents.

Printing of Covert Materials such as UV

Many images, such as color images, are formed by subtractive techniques, e.g., light is passed through absorbing dyes and the combination of dyes produce an image by sequentially subtracting cyan, magenta, and yellow components to provide the full color image. In the case of a UV fluorescing image, the UV image is formed by light emitting from fluorescing dyes or pigments as they are activated by a UV light or energy source. In some implementations, a special pigments or dyes used to form a given image can fluoresce in a first color when exposed to light having a first wavelength and a second color when exposed to light having a second wavelength.

A UV image can be imparted to an ID document via methods such as thermal transfer or D2T2. For example, a separate dye diffusion panel can include dye having UV properties (e.g., but which does not include a visible spectrum color) to impart an UV image to an ID document, or UV materials can be incorporated into an existing color panel (e.g., into the yellow panel). A UV image can also be imparted via a mass transfer panel (or thermal mass transfer) panel. Standard dye diffusion printers, such as those manufactured by Atlantek and Eltron, often incorporate both dye diffusion and mass transfer panels. A mass transfer panel typically includes a resin (e.g., a resin including black or color pigments or dyes) that can be thermally transferred to the ID document. A separate mass transfer panel can include pigments or dyes having UV properties to impart a UV image to an ID document, or UV materials can be incorporated into a specially constructed black panel, as described herein. A mass transfer process can be used to produce an image, which is invisible in ordinary light, but glows in UV light.

Regardless of whether the UV materials are imparted via D2T2 or mass transfer panel, both panels can produce transmissive images—e.g., the mass transfer panel can produce a bitonal (e.g., two tones) image and the dye sublimation panel can produce a monochromatic (or shaded) image.

The invention provides identification documents and related method for making and verifying documents with a three dimensional or moving image effect. In particular embodiments, the effects are created by printing image layers of invisible inks, such as UV or IR fluorescing inks, each depicting an object in varying position or perspective in an area on the document. When the area is strobed sequentially in different bands corresponding to the different layers, the layers become visible sequentially or simultaneously, creating a moving and/or three dimensional effect.

One aspect of the invention is an identification document with document layers, including two or more printed image layers. The image layers having different ink properties that when illuminated in different illumination bands become detectable in a detection band, such as the visible band, for example. The image layers are arranged relative to each other to create a three dimensional effect when strobed with illumination in the illumination bands corresponding to the image layers. For example, the image layers are interleaved over a particular area on the document to create the effect that the object depicted in the separate layers is moving or is three dimensional within that area.

Another aspect of the invention is an identification document that creates a moving image effect. In this case, the image layers depict an object at different positions, or with varying appearance. The strobing of the image layers causes them to be detectable in a sequence such that they portray a moving image sequence.

Additional aspects of the invention are methods for making and verifying the authenticity of identification documents with these types of three dimensional and moving image effects. Three dimensional modeling software may be used to generate images of different perspectives from a single image of an object. The effects may be created for variable data on the document, such as the bearer's facial photo or other biometric information.

The foregoing and other features and advantages of the present invention will be even more readily apparent from the following Detailed Description, which proceeds with reference to the accompanying drawings and the claims.

BRIEF DESCRIPTION OF THE DRAWINGS

The advantages, features, and aspects of embodiments of the invention will be more fully understood in conjunction with the following detailed description and accompanying drawings, wherein.

Of course, the drawings are not necessarily drawn to scale, with emphasis rather being placed upon illustrating the principles of the invention. In the drawings, like reference numbers indicate like elements or steps. Further, throughout this application, certain indicia, information, identification documents, data, etc., may be shown as having a particular cross sectional shape (e.g., rectangular) but that is provided by way of example and illustration only and is not limiting, nor is the shape intended to represent the actual resultant cross sectional shape that occurs during manufacturing of identification documents.

DETAILED DESCRIPTION

Terminology

In the foregoing discussion, the use of the word "ID document" is broadly defined and intended to include all types of ID documents, including (but not limited to), documents, magnetic disks, credit cards, bank cards, phone cards, stored value cards, prepaid cards, smart cards (e.g., cards that include one more semiconductor chips, such as memory devices, microprocessors, and microcontrollers), contact cards, contactless cards, proximity cards (e.g., radio frequency (RFID) cards), passports, driver's licenses, network access cards, employee badges, debit cards, security cards, visas, immigration documentation, national ID cards, citizenship cards, social security cards, security badges, certificates, identification cards or documents, voter registration and/or identification cards, police ID cards, border crossing cards, security clearance badges and cards, legal instruments, gun permits, badges, gift certificates or cards, membership cards or badges, and tags. Also, the terms "document," "card," "badge" and "documentation" are used interchangeably throughout this patent application.). In at least some aspects of the invention, ID document can include any item of value (e.g., currency, bank notes, and checks) where authenticity of the item is important and/or where counterfeiting or fraud is an issue.

In addition, in the foregoing discussion, "identification" at least refers to the use of an ID document to provide identification and/or authentication of a user and/or the ID document itself. For example, in a conventional driver's license, one or more portrait images on the card are intended to show a likeness of the authorized holder of the card. For purposes of identification, at least one portrait on the card (regardless of whether or not the portrait is visible to a human eye without appropriate stimulation) preferably shows an "identification quality" likeness of the holder such that someone viewing the card can determine with reasonable confidence whether the holder of the card actually is the person whose image is on the card. "Identification quality" images, in at least one embodiment of the invention, include covert images that, when viewed using the proper facilitator (e.g., an appropriate light or temperature source), provide a discernable image that is usable for identification or authentication purposes.

There are a number of reasons why an image or information on an ID document might not qualify as an "identification quality" image. Images that are not "identification quality" may be too faint, blurry, coarse, small, etc., to be able to be discernable enough to serve an identification purpose. An image that might not be sufficient as an "identification quality" image, at least in some environments, could, for example, be an image that consists of a mere silhouette of a person, or an outline that does not reveal what might be considered essential identification essential (e.g. hair or eye color) of an individual.

Of course, it is appreciated that certain images may be considered to be "identification quality" if the images are machine readable or recognizable, even if such images do not appear to be "identification quality" to a human eye, whether or not the human eye is assisted by a particular piece of equipment, such as a special light source. For example, in at least one embodiment of the invention, an image or data on an ID document can be considered to be "identification quality" if it has embedded in it machine-readable information (such as digital watermarks or steganographic information) that also facilitate identification and/or authentication.

Further, in at least some embodiments, "identification" and "authentication" are intended to include (in addition to the conventional meanings of these words), functions such as recognition, information, decoration, and any other purpose for which an indicia can be placed upon an article in the article's raw, partially prepared, or final state. Also, instead of ID documents, the inventive techniques can be employed with product tags, product packaging, business cards, bags, charts, maps, labels, etc., etc., particularly those items including marking of an laminate or over-laminate structure. The term ID document thus is broadly defined herein to include these tags, labels, packaging, cards, etc.

"Personalization", "Personalized data" and "variable" data are used interchangeably herein, and refer at least to data, images, and information that are "personal to" or "specific to" a specific cardholder or group of cardholders. Personalized data can include data that is unique to a specific cardholder (such as biometric information, image information, serial numbers, Social Security Numbers, privileges a cardholder may have, etc.), but is not limited to unique data. Personalized data can include some data, such as birthdate, height, weight, eye color, address, etc., that are personal to a specific cardholder but not necessarily unique to that cardholder (for example, other cardholders might share the same personal data, such as birthdate). In at least some embodiments of the invention, personal/variable data can include some fixed data, as well. For example, in at least some embodiments, personalized data refers to any data that is not pre-printed onto an ID document in advance, so such personalized data can include both data that is cardholder-specific and data that is common to many cardholders. Variable data can, for example, be printed on an information-bearing layer of the ID card using thermal printing ribbons and thermal printheads.

The terms "indicium" and indicia as used herein cover not only markings suitable for human reading, but also markings intended for machine reading. Especially when intended for machine reading, such an indicium need not be visible to the human eye, but may be in the form of a marking visible only under infra-red, ultra-violet or other non-visible radiation. Thus, in at least some embodiments of the invention, an indicium formed on any layer in an identification document (e.g., the core layer) may be partially or wholly in the form of a marking visible only under non-visible radiation. Markings comprising, for example, a visible "dummy" image superposed over a non-visible "real" image intended to be machine read may also be used.

"Laminate" and "overlaminate" include (but are not limited to) film and sheet products. Laminates usable with at least some embodiments of the invention include those which contain substantially transparent polymers and/or substantially transparent adhesives, or which have substantially transparent polymers and/or substantially transparent adhesives as a part of their structure, e.g., as an extruded feature. Examples of usable laminates include at least polyester, polycarbonate, polystyrene, cellulose ester, polyolefin, polysulfone, or polyamide. Laminates can be made using either an amorphous or biaxially oriented polymer as well. The laminate can comprise a plurality of separate laminate layers, for example a boundary layer and/or a film layer.

The degree of transparency of the laminate can, for example, be dictated by the information contained within the identification document, the particular colors and/or security features used, etc. The thickness of the laminate layers is not critical, although in some embodiments it may be preferred that the thickness of a laminate layer be about 1-20 mils. Lamination of any laminate layer(s) to any other layer of material (e.g., a core layer) can be accomplished using any conventional lamination process, and such processes are will-known to those skilled in the production of articles such as identification documents. Of course, the types and structures of the laminates described herein are provided only by way of example, those skilled in the art will appreciated that many different types of laminates are usable in accordance with the invention.

For example, in ID documents, a laminate can provide a protective covering for the printed substrates and provides a level of protection against unauthorized tampering (e.g., a laminate would have to be removed to alter the printed information and then subsequently replaced after the alteration.). Various lamination processes are disclosed in assignee's U.S. Pat. Nos. 5,783,024, 6,007,660, 6066594, and 6,159,327. Other lamination processes are disclosed, e.g., in U.S. Pat. Nos. 6,283,188 and 6,003,581. Each of these U.S. Patents is herein incorporated by reference.

The material(s) from which a laminate is made may be transparent, but need not be. Laminates can include synthetic resin-impregnated or coated base materials composed of successive layers of material, bonded together via heat, pressure, and/or adhesive. Laminates also includes security laminates, such as a transparent laminate material with proprietary security technology features and processes, which protects documents of value from counterfeiting, data alteration, photo substitution, duplication (including color photocopying), and simulation by use of materials and technologies that are commonly available. Laminates also can include thermosetting materials, such as epoxy.

For purposes of illustration, the following description will proceed with reference to ID document structures (e.g., TESLIN-core, multi-layered ID documents) and fused polycarbonate structures. It should be appreciated, however, that the present invention is not so limited. Indeed, as those skilled in the art will appreciate, the inventive techniques can be applied to many other structures formed in many different ways. For example, in at least some embodiments, the invention is usable with virtually any product which is made to carry printing of inks that create 3D and/or moving images in response to illumination, especially articles to which a laminate and/or coating is applied, including articles formed from paper, wood, cardboard, paperboard, glass, metal, plastic, fabric, ceramic, rubber, along with many man-made materials, such as microporous materials, single phase materials, two phase materials, coated paper, synthetic paper (e.g., TYVEC, manufactured by Dupont Corp of Wilmington, Del.), foamed polypropylene film (including calcium carbonate foamed polypropylene film), plastic, polyolefin, polyester, polyethylenetelphthalate (PET), PET-G, PET-F, and polyvinyl chloride (PVC), and combinations thereof.

Strobed Images that Produce Moving and/or 3D Effects

In this section, we describe a feature for identification documents that creates a 3D and/or moving image effect. To achieve this effect, the document includes two or more juxtaposed images printed with inks that become detectable at a particular band (frequencies/wavelengths) in the electromagnetic (EM) spectrum when strobed with illumination at corresponding bands in the EM spectrum. To simplify the description, we use the term "strobe" to encompass all forms of illumination that varies temporally, such as pulsing a light source on and off at discrete time intervals.

In the implementations described in this section, the images are positioned on the document in an overlapping and/or interleaved arrangement so that the images are spatially juxtaposed over a time period of strobed illumination to create the 3D and/or moving effect of objects depicted in the images.

To create a 3D effect in the visible band, the images represent an object, collection of objects or scene from different perspectives. In this case, the viewer sees the objects from different perspectives as the corresponding images become visible in response to the strobed illumination. In response, the viewer's visual perception system combines the images to create a 3D effect. The time varying illumination may cause the images to become visible at the same time or at nearly the same time such that the viewer perceives the 3D effect.

To create a moving effect in the visible band, the images represent an object or collection of objects at different position(s) and/or changing appearance. In this case, the viewer sees the objects change over time as the corresponding images become visible in response to strobed illumination. In response, the viewer's perceptual system interprets the changes as motion of the objects in a manner similar to video or animation effects.

In both cases, the images are formed on a substrate using inks with different properties. In particular, each ink becomes detectable in a particular band ("detection band") when illuminated with a source in a corresponding band ("illumination band"), which may or may not be the same band as the detection band. Preferably, images printed with these inks are not human visible in the visible band in response to visible light illumination. In this case, the images are invisible under normal viewing conditions, but become visible when strobed with an illumination source in corresponding illumination bands.

We use the terms "illumination bands" and "detection bands" to generalize the discussion beyond specific bands like the visible band. To create a 3D or moving image effect that a person can view without the aid of a special device, our implementation uses inks that convey images that are detectable in the visible band when strobed. However, a similar effect can be created using inks that are detectable in a band that is not visible. Images created with these inks are detected in non visible bands using an array of image sensors that detect EM waves in the non visible bands, like UV or IR, for example. These images can then be converted to signals and displayed as visible light on a display device, and/or processed for extracting machine readable data such as extracting digital information from a digital watermark, bar code or other data carrier conveyed in the images. For information on embedding and reading digital watermarks in images, see U.S. Pat. No. 6,614,914, which is hereby incorporated by reference.

The following table gives an example of ink properties that can be used for this application, where the illumination band is not visible. In this case, the images are invisible under normal viewing conditions (e.g., when illuminated by visible light).

| Illumination Band | Detection Band |
|---|---|
| UV | Visible |
| IR | Visible |
| UV | UV |
| IR | UV |
| UV | IR |
| IR | IR |

In the case of the invisible inks shown in the first two rows, the ink is detectable in the visible band when illuminated with a UV/IR source, and thus, can be used to create image effects that are human and machine readable when strobed. In the case of the invisible inks listed in the other rows, the inks are detectable in non-visible bands, and thus, require a sensor in these non-visible bands (e.g., UV/IR) for detection.

Generally speaking, the inks can be chosen so as to reflect, emit or fluoresce in the detection band in response to illumination in the corresponding illumination band. Two possible sources of fluorescing inks with these attributes include Gans Ink and Supply of Los Angeles, Calif., and PhotoSecure, Inc. of Boston, Mass. The types of illumination and detection bands are not intended to be limiting, and other bands may be used depending on the needs of a particular application.

In the case of fluorescing inks, the inks have a decay time over which the fluorescing decays after the illumination source is turned off. When used for moving images/3D effects described here, the length of time that the illumination source is turned on and off is established by taking into account the decay time of the ink so that the image layers in different inks are detectable (e.g., visible) in the desired time periods. This control of the strobing relative to the properties of the layers enables image layers to be made detectable in a desired sequence or simultaneously, as desired, to create a 3D and/or moving effect.

Figure 3:
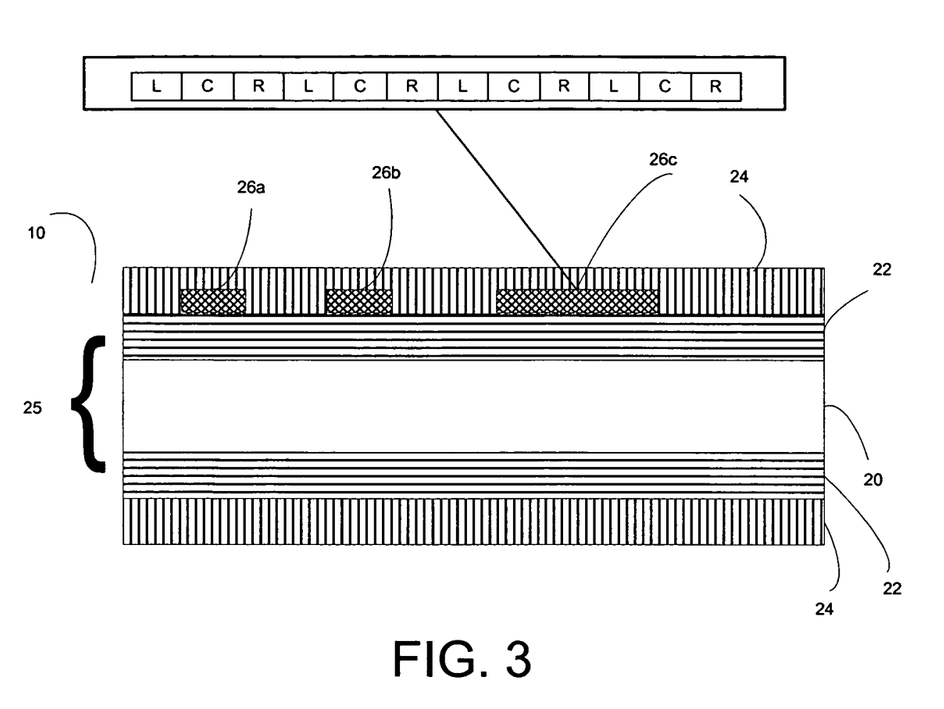
FIG. 3 is a diagram illustrating a cross section of an identification document with printing that creates a three dimensional effect when strobed with illumination.

FIG. 3 illustrates an example of printing on the identification document of FIG. 2 that creates a 3D effect. In this example, the identification document enrollment system generates images portraying three perspectives of the ID document bearer's head. These are referred to as L for Left, C for Center, and R for right. Each image is printed with different inks having corresponding illumination and detection bands. These left, right and center images are printed in an interleaved arrangement so that when strobed with a light source in the inks' illumination bands in sequence, the images become detectable in the detection bands in a sequence or simultaneously. When the detection band is the visible band, the viewer sequentially and/or simultaneously sees portions of at least two perspectives of the head. This viewing of different perspectives over a time period in which each image is strobed creates the desired three-dimensional effect.

When using fluorescing inks, the implementer can select inks with desired decay times and can set the time period for turning on the illumination in the inks' respective illumination bands so as to make the images visible in overlapping or non-overlapping time periods. Even if the time periods due not overlap, the viewer's perceptual system will, to some extent, form the 3D effect due to seeing multiple images of the different perspectives in close succession.

While the effect can be created with two or more images, we illustrate an example with three images of different perspectives of the subject.

In this example implementation, the images are interleaved along the vertical access of the subject's head in each of the images. In particular, substantially parallel, linear strips of the L, C, and R images are aligned in a direction along the vertical axis of the photo, and the strips are interleaved in the horizontal direction. In this case of vertically interleaved strips, FIG. 3 shows a cross sectional view of the document layers along the vertical axis of the subject. In alternative implementations, the images can be captured from additional and/or different perspectives, such as top, center, bottom, and the interleaving may be performed along horizontal or other axes to create a desired three dimensional effect. The inks may be chosen so that the images of the different perspectives appear in one or more colors.

While the above description uses the example of a photo of the bearer's head, other images, photos, or graphic designs may be used. The photo provides advantages because it is variable data associated with the bearer of the identification document, and it can be visually matched with the bearer's photo elsewhere on the document.

Figure 4:
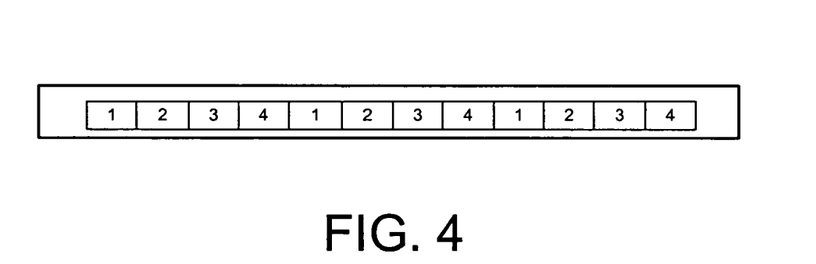
FIG. 4 is a diagram illustrating an example of printing that creates a moving image effect when strobed with illumination.

FIG. 4 illustrates an example of printing on the identification document that creates a moving image effect. Blocks 1, 2, 3 and 4 represent strips of interleaved images 1, 2, 3 and 4. These images depict an object in different positions. When the illumination source strobes the illumination bands of each image in sequence (1, 2, 3, then 4), each image becomes detetable in its detection band for an amount of time during and after (e.g., fluorescing decay time) the corresponding illumination period in its illumination band. In the particular case where the detection band is the visible band for each image, the viewer sees the images 1, 2, 3, 4 in sequence.

The form of interleaving shown in FIG. 4 is just one example. The images can be positioned adjacent each other with some portion of each image overlapping (e.g., interleaved in the overlap portion) the adjacent image. Alternatively, the images can be interleaved in vertical, horizontal or other directions to create a desired motion effect. Also, the interleaved parts of the different images can be substantially contiguous as shown, or may be separated by areas without any ink so as to allow for some tolerance in the registration of the printing of each ink layer corresponding to the separate images.

Figure 5:
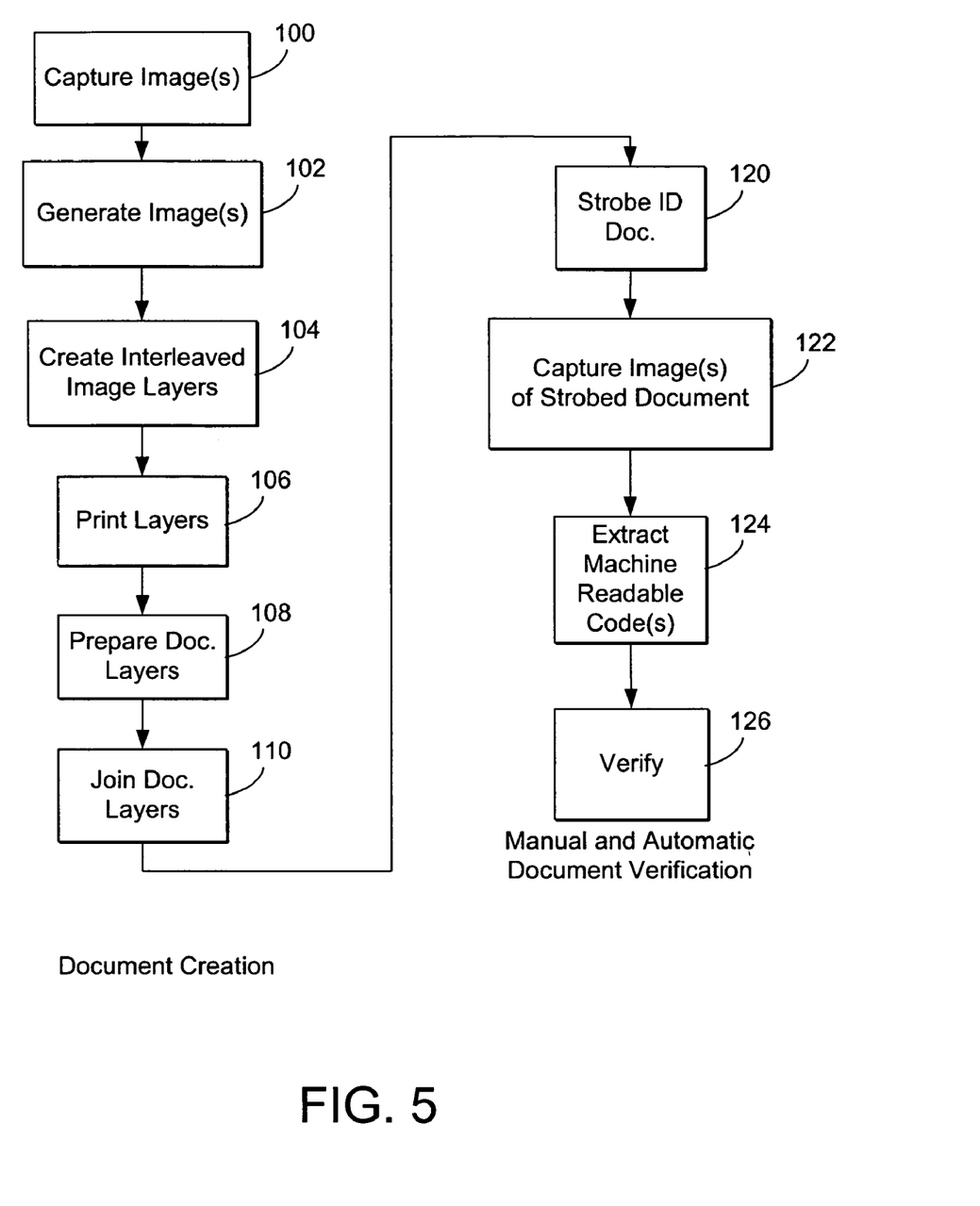
FIG. 5 is a flow diagram illustrating a method for creating and verify identification documents with a 3D and/or moving image effect.

FIG. 5 is a flow diagram illustrating a method for creating and verify identification documents with a 3D and/or moving image effect. The left side of the flow diagram illustrates the document creation process, while the right side illustrates the verification process.

First, the images that are printed in the separate ink layers (such as the L, C and R images used in FIG. 3, and the 1, 2, 3 and 4 images used in FIG. 4) are captured and/or generated as shown in blocks 100 and 102. For example, if the effect is based on variable image data captured at the time of enrollment, such as the bearer's photo or some other biometric image, that image data is captured and/or generated from captured image data taken from the bearer.

In the case where the facial photo is used for a 3D effect, a digital image capture system captures one or more photos of the bearer's face. One approach is to capture a single image and then extract images from different perspectives using 3D modeling software. In particular, 3D facial modeling software extracts a three dimensional model of the subject from the digital image, and then generates two or more two-dimensional images from desired perspectives from the three dimensional model. Software for generating the three dimensional model from the digital image is available from Cyberextruder.com, Inc. and is also described in International Patent Publication WO 02/095677, published Nov. 28, 2002, which is hereby incorporated by reference. Once the 3D model is created, 3D rendering software is used to convert the model into two dimensional images at the desired viewing perspectives.

Another way is to capture two or more digital images of the subject from different perspectives by placing image capture station(s) at locations (preferably equidistant) around the subject, and capturing an image at each of the locations, or using 3D camera equipment with optical systems for capturing images at the different perspectives. Analog film and optics systems may be used to capture images from the different perspectives, and the film may then be processed to create a composite image interleaving the images of the different perspectives.

In the case where a motion effect is desired, separate images may be captured or generated of an object in different positions. One way to do this is to capture one image, and then geometrically warp or transform the image to create renderings of the object in different positions. The image may be created entirely from synthetic graphical objects or symbols, it may be created entirely from natural imagery captured on film or digital memory, or it may be a combination of natural and synthetic imagery, such as an animated issuer graphic, logo or seal moving across the bearer's face or other portion on the document. Symbolic machine-readable codes such as bar codes or glyphs may be superimposed into one or more of the images. Digital watermarks carrying machine readable digital data may also be embedded into one or more of the images. As described further below, portions of the codes or digital watermarks may be conveyed in the separate images so that the code/digital watermark is conveyed through a sequence of strobing each separate image, and capturing a composite image combining images captured from separate time intervals.

Next, the process interleaves the separate images into interleaved image layers (104). In the case where each layer is printed with separate ink in a separate printing pass, the image layers remain separate, yet the image data from each image is mapped into parts at spatial locations corresponding to their locations on the document. These parts may be spaced apart so as to leave space for interleaving of parts from the other image layers.

The image layers are then printed in separate ink layers on a document layer, such as the core or laminate layer, such as shown in FIG. 3 (106). The document layer with the printing and other layers, such as one or more laminates, are then optionally prepared with protective coatings and/or adhesives and joined together (108, 110) through lamination or alternative joining methods. This process creates an identification document with a moving and/or 3D image effect that is revealed in a verification process.

In the verification process, a user places the identification document under a strobed light source that illuminates the image layers in the corresponding illumination bands. This light source may be integrated with an image capture device that captures images in the detection bands at desired times relative to the strobing times.

The light source strobes the identification document, and the user examines it for the expected 3D and/or moving image effect (120), assuming that the detection band is the visible band. If the detection band is not the visible band, then sensors in the detection band are used to capture images, and an image processing devices either converts these images to a viewable form and/or makes a machine verification. In particular, if equipped with an image capture device, the verification system captures images of the strobed document and performs verification functions, such as converting the received images to a visible format for display, and/or extracting machine readable codes or digital watermarks (124) to verify the document's validity. These codes can include fixed and/or variable information such as bearer information (name, date of birth), issuer information, hashes of other data on the document, etc. The system uses this information in conjunction with the user's verification of the visible information to verify that the document is valid.

As an additional security feature, machine readable codes such as bar codes, digital watermarks, glyphs, etc. may be spatially segmented into parts, and the parts carried in the separate image layers. To read the codes, images are captured of the entire image area each time one layer becomes detectable in response to its illumination. These images are then combined into a composite image from which the code/digital watermark message is extracted using compatible reading software/hardware.

Concluding Remarks

Having described and illustrated the principles of the technology with reference to specific implementations, it will be recognized that the technology can be implemented in many other, different, forms, and in many different environments.

The technology disclosed herein can be used in combination with other technologies. Also, instead of ID documents, the inventive techniques can be employed with product tags, product packaging, labels, business cards, bags, charts, smart cards, maps, labels, etc., etc. The term ID document is broadly defined herein to include these tags, maps, labels, packaging, cards, etc.

It should be appreciated that while FIG. 1 illustrates a particular species of ID document—a driver's license—the present invention is not so limited. Indeed our inventive methods and techniques apply generally to all identification documents defined above. Moreover, our techniques are applicable to non-ID documents, e.g., such as printing or forming covert images on physical objects, holograms, etc., etc. Further, instead of ID documents, the inventive techniques can be employed with product tags, product packaging, business cards, bags, charts, maps, labels, etc., etc., particularly those items including providing a non-visible indicia, such as an image information on an over-laminate structure. The term ID document is broadly defined herein to include these tags, labels, packaging, cards, etc. In addition, while some of the examples above are disclosed with specific core components, it is noted that-laminates can be sensitized for use with other core components. For example, it is contemplated that aspects of the invention may have applicability for articles and devices such as compact disks, consumer products, knobs, keyboards, electronic components, decorative or ornamental articles, promotional items, currency, bank notes, checks, etc., or any other suitable items or articles that may record information, images, and/or other data, which may be associated with a function and/or an object or other entity to be identified.

It should be understood that various printing processes can be used to create the identification documents described in this document. It will be appreciated by those of ordinary skill in the art that several print technologies including but not limited to indigo (variable offset) laser xerography (variable printing), offset printing (fixed printing), inkjet (variable printing), dye infusion, mass-transfer, wax transfer, variable dot transfer can be used to print variable and/or fixed information one or more layers of the document. The information can be printed using dots, lines or other structures of varying colors to form text or images. The information also can comprise process colors, spot or pantone colors.

It should be appreciated that the methods described above or in the incorporated documents with respect to processing data stored in machine readable devices in the document can be carried out on a general-purpose computer. These methods can, of course, be implemented using software, hardware, or a combination of hardware and software. Systems and methods in accordance with the invention can be implemented using any type of general purpose computer system, such as a personal computer (PC), laptop computer, server, workstation, personal digital assistant (PDA), mobile communications device, interconnected group of general purpose computers, and the like, running any one of a variety of operating systems. We note that some image-handling software, such as Adobe's PrintShop, as well as image-adaptive software such as LEADTOOLS (which provide a library of image-processing functions and which is available from LEAD Technologies, Inc., of Charlotte, N.C.) can be used to facilitate these methods, including steps such as providing enhanced contrast, converting from a color image to a monochromatic image, thickening of an edge, dithering, registration, etc. An edge-detection algorithm may also be incorporated with, or used in concert with, such software. Computer executable software embodying these software methods, functions or routines can be stored on a computer readable media, such as a diskette, removable media, DVD, CD, hard drive, electronic memory circuit, etc.).

It should be understood that, in the Figures of this application, in some instances, a plurality of system elements or method steps may be shown as illustrative of a particular system element, and a single system element or method step may be shown as illustrative of a plurality of a particular systems elements or method steps. It should be understood that showing a plurality of a particular element or step is not intended to imply that a system or method implemented in accordance with the invention must comprise more than one of that element or step, nor is it intended by illustrating a single element or step that the invention is limited to embodiments having only a single one of that respective elements or steps. In addition, the total number of elements or steps shown for a particular system element or method is not intended to be limiting; those skilled in the art will recognize that the number of a particular system element or method steps can, in some instances, be selected to accommodate the particular user needs.

To provide a comprehensive disclosure without unduly lengthening the specification, applicants hereby incorporate by reference each of the U.S. patent documents referenced above.

The technology and solutions disclosed herein have made use of elements and techniques known from the cited documents. Other elements and techniques from the cited documents can similarly be combined to yield further implementations within the scope of the present invention.

Thus, the exemplary embodiments are only selected samples of the solutions available by combining the teachings referenced above. The other solutions necessarily are not exhaustively described herein, but are fairly within the understanding of an artisan given the foregoing disclosure and familiarity with the cited art. The particular combinations of elements and features in the above-detailed embodiments are exemplary only; the interchanging and substitution of these teachings with other teachings in this and the incorporated-by-reference patent documents are also expressly contemplated.

In describing the embodiments of the invention illustrated in the figures, specific terminology is used for the sake of clarity. However, the invention is not limited to the specific terms so selected, and each specific term at least includes all technical and functional equivalents that operate in a similar manner to accomplish a similar purpose.

What is claimed is:

1. An identification document comprising:
   document layers, including two or more printed image layers;
   the image layers having different ink properties that when illuminated in different illumination bands become detectable in a detection band;
   the image layers being arranged relative to each other and depicting an object from different perspectives to collectively create a three dimensional appearance of the object in response to being strobed with illumination in the illumination bands corresponding to the image layers, the printed image layers representing a two dimensional representation of the object when not responding to the illumination in the illumination bands.

2. The document of claim 1 wherein at least one of the image layers is not human visible when illuminated in a human visible band.

3. The document of claim 2 wherein the image layers are not human visible when illuminated in the human visible band.

4. The document of claim 3 wherein the detection band is the human visible band.

5. The document of claim 4 wherein the image layers emit light in the human visible band when illuminated in different non-visible illumination bands.

6. The document of claim 5 wherein the image layers fluoresce in the human visible band when illuminated in different non-visible illumination bands.

7. The document of claim 1 wherein the detection band is a visible band.

8. The document of claim 1 wherein the image layers depict variable information associated with a bearer of the identification document.

9. The document of claim 8 wherein the image layers depict a photo of the bearer that appears three dimensional when strobed.

10. The document of claim 1 wherein the image layers depict an object from different perspectives and are interleaved over an area on the document such that when strobed, a viewer sees the different perspectives over the area and perceives a three dimensional effect of the object.

11. The document of claim 10 wherein the object is a head of a bearer of the identification document.

12. The document of claim 1 wherein the image layers include segments of a machine readable code such that when strobed, the machine readable code becomes detectable in a composite image formed from the image layers.

13. The document of claim 12 wherein the machine readable code comprises digital data in a digital watermark.

14. An identification document comprising:
    document layers, including two or more printed image layers, wherein the image layers are not human visible when illuminated in the human visible band;
    the image layers having different ink properties that when illuminated in different illumination bands become detectable in a detection band;
    the image layers being arranged relative to each other to collectively create a moving image effect when strobed with illumination in the illumination bands corresponding to the image layers, the printed image layers representing a stationary image effect when not responding to the illumination in the illumination bands.

15. The document of claim 14 wherein the detection band is the human visible band.

16. The document of claim 15 wherein the image layers emit light in the human visible band when illuminated in different non-visible illumination bands.

17. The document of claim 16 wherein the image layers fluoresce in the human visible band when illuminated in different non-visible illumination bands.

18. The document of claim 14 wherein the detection band is a visible band.

19. An identification document comprising:
    document layers, including two or more printed image layers;
    the image layers having different ink properties that when illuminated in different illumination bands become detectable in a detection band; the image layers being arranged relative to each other to collectively create a moving image effect when strobed with illumination in the illumination bands corresponding to the image layers; wherein the image layers depict an object;
    each image layer depicting a different position of the object, wherein the object appears to move when strobed;
    and wherein the image layers are interleaved over an area on the document such that when strobed, a viewer sees the different positions of the object and perceives a moving object effect in the area of document, the printed image layers representing a stationary image effect when not responding to the illumination in the illumination bands.

20. The document of claim 19 wherein the object is a head of a bearer of the identification document.

21. An identification document comprising:
    document layers, including two or more printed image layers;
    the image layers having different ink properties that when illuminated in different illumination bands become detectable in a detection band;
    the image layers being arranged relative to each other to collectively create a moving image effect when strobed with illumination in the illumination bands corresponding to the image layers;
    wherein the image layers include segments of a machine readable code such that when strobed, the machine readable code becomes detectable in a composite image formed from the image layers, the printed image layers representing a stationary image effect when not responding to the illumination in the illumination bands.

22. The document of claim 21 wherein the machine readable code comprises digital data in a digital watermark.

23. A method of making an identification document comprising:
- generating image layers depicting an object from different perspectives;
- printing the image layers with inks having different properties such that when the inks are illuminated in different illumination bands, the ink layers printed with the inks become detectable in a detection band;
- the image layers being arranged relative to each other to collectively create a three dimensional appearance when strobed with illumination in the illumination bands corresponding to the image layers, the printed image layers representing a two dimensional representation of the object when not responding to the illumination in the illumination bands.

24. The method of claim 23 wherein one or more of the image layers are generated from a three dimensional model extracted from a single image of an object to be depicted in the three dimensional effect.

25. The method of claim 24 wherein the object is a head of a bearer of an identification document, and the single image comprises a photo of the bearer.

26. A method of making an identification document comprising:
- generating image layers depicting an object from different perspectives;
- printing the image layers with inks having different properties such that when the inks are illuminated in different illumination bands, the ink layers printed with the inks become detectable in a detection band;
- the image layers being arranged relative to each other to collectively create a moving image effect when strobed with illumination in the illumination bands corresponding to the image layers, the printed image layers representing a stationary image effect of the object when not responding to the illumination in the illumination bands.

27. The method of claim 26 wherein the image layers are printed in an interleaved arrangement in an area of the document, and the image layers depict an object in different positions such that when strobed, the object appears to move within the area on the document.

28. The method of claim 27 wherein the area is located in an area depicting a facial photo of the bearer of the identification document.

29. The method of claim 27 wherein the object comprises a head of the bearer of the identification document.

30. The method of claim 27 wherein the object comprises a graphical symbol.

31. The method of claim 30 wherein the graphical symbol appears to move over a facial photo on the document when strobed.

32. A method of verifying an identification document comprising:
- strobing an area on the document with illumination in different illumination bands, the document including two or more image layers depicting an object;
- each image layer depicting within the area, a different position or perspective of the object;
- each of the layers being printed with inks in the area having different illumination bands that cause the object to be detectable in a detection band;
- detecting a moving image or three dimensional appearance of the object in the detection band caused by the strobing, the printed image layers representing a stationary image effect of the object when the different positions are not responding to the illumination in the illumination bands or a two dimensional representation of the object when the different perspectives are not responding to the illumination in the illumination bands.

33. The method of claim 32 including machine capturing images of the area at intervals during the strobing of illumination in the illumination bands that makes each image layer detectable in the detection band.

34. The method of claim 33 including extracting a machine readable code from a composite image formed form the captured images.

35. The method of claim 34 wherein the machine readable code comprises digital data in a digital watermark embedded in the image layers.

* * * * *